(12) United States Patent
Kawamura et al.

(10) Patent No.: US 6,883,544 B2
(45) Date of Patent: Apr. 26, 2005

(54) SOLENOID VALVE WITH IMPROVED MAGNETIC ATTRACTIVE FORCE

(75) Inventors: Futoshi Kawamura, Kariya (JP); Masahiko Ochiai, Nagoya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/730,359

(22) Filed: Dec. 9, 2003

(65) Prior Publication Data

US 2004/0114303 A1 Jun. 17, 2004

Related U.S. Application Data

(62) Division of application No. 10/107,207, filed on Mar. 28, 2002, now Pat. No. 6,688,334.

(30) Foreign Application Priority Data

Mar. 29, 2001 (JP) .......................................... 2001-94799
Oct. 18, 2001 (JP) .......................................... 2001-320945
Jan. 28, 2002 (JP) .......................................... 2002-18324

(51) Int. Cl.[7] ............................................. F16K 31/02
(52) U.S. Cl. ........................... 137/625.65; 251/129.07; 251/325
(58) Field of Search ........................ 257/129.07, 129.15, 257/325; 137/625.65

(56) References Cited

U.S. PATENT DOCUMENTS

| 3,606,241 | A | * | 9/1971 | Bornholdt | ............... 251/129.07 |
| 4,563,664 | A | * | 1/1986 | Chin et al. | ................... 335/274 |
| 5,051,631 | A | | 9/1991 | Anderson | |
| 5,402,093 | A | * | 3/1995 | Gibas et al. | ............ 251/129.07 |
| 5,615,860 | A | * | 4/1997 | Brehm et al. | ........... 251/129.07 |
| 5,868,167 | A | | 2/1999 | Miki et al. | |
| 5,871,201 | A | | 2/1999 | Cornea et al. | |
| 6,315,268 | B1 | * | 11/2001 | Cornea et al. | ......... 137/625.65 |

FOREIGN PATENT DOCUMENTS

| DE | 199 34 846 A1 | * | 7/1999 |
| JP | 61-244984 | | 10/1986 |
| JP | 10-38126 | | 2/1998 |
| JP | 11-118062 | | 4/1999 |
| JP | 2001-187979 | | 7/2001 |

\* cited by examiner

*Primary Examiner*—John Bastianelli
(74) *Attorney, Agent, or Firm*—Nixon & Vanderhye PC

(57) ABSTRACT

In a solenoid valve, a boss portion is formed integrally with an attracting portion of a stator core at an outer peripheral side of the attracting portion. The boss portion has a tapered outer peripheral surface and a tapered inner peripheral surface. A plunger has a communication passage, which extends through the plunger generally along a central axis of the plunger.

12 Claims, 7 Drawing Sheets

STROKE DISPLACEMENT OF PLUNGER

STROKE DISPLACEMENT OF PLUNGER

SOLENOID VALVE WITH IMPROVED MAGNETIC ATTRACTIVE FORCE

RELATED APPLICATION

This application is a division of U.S. application Ser. No. 10/107,207 filed Mar. 28, 2002, now U.S. Pat. No. 6,688,334.

CROSS REFERENCE TO RELATED APPLICATION

This application is based on and incorporates herein by reference Japanese Patent Application No. 2001-94799 filed on Mar. 29, 2001, Japanese Patent Application No. 2001-320945 filed on Oct. 18, 2001 and Japanese Patent Application No. 2002-18324 filed on Jan. 28, 2002.

BACKGROUND OF THE INVENTION

1. Field of the Invention

The present invention relates to a solenoid valve, which has a slider (plunger) supported in a reciprocable manner. More specifically, the present invention relates to a solenoid-operated oil pressure control valve, which selectively supplies and drains oil pressure of an oil pressure source relative to a retarding oil pressure chamber(s) and an advancing oil pressure chamber(s) of an intake/exhaust variable valve timing mechanism that changes a valve timing of at least one of an intake valve and an exhaust valve of an internal combustion engine.

2. Description of Related Art

Japanese Unexamined Patent Publication No. 10-38126, German Unexamined Patent Publication No. 19504185 and Japanese Unexamined Patent Publication No. 11-118062 disclose a solenoid valve, which has a slider (plunger) supported in a reciprocable manner. The solenoid valve further includes a coil, a spring, a stator and a slider supporting member. The coil generates magnetomotive force for attracting the slider in one of reciprocating directions of the slider. The spring provides urging force for urging the slider in the other of the reciprocating directions of the slider. The stator forms a magnetic circuit in cooperation with the slider and has an attracting portion for attracting the slider. The slider supporting member is arranged radially inward of the stator and supports the slider in the reciprocable manner.

Furthermore, Japanese Unexamined Patent Publication No. 2001-187979 also discloses such a solenoid valve. In the solenoid valve disclosed in Japanese Unexamined Patent Publication No. 2001-187979, a distal end of a slider (plunger) is tapered. Because of the tapered distal end of the slider, a contact surface area between the slider and a cup-shaped non-magnetic body (plunger guide) is reduced, and thus larger friction causing wearing is generated in the contact surface between the slider and the non-magnetic body. Furthermore, the tapered distal end of the slider provides a greater chance of introducing debris and dusts between the slider and the non-magnetic body, causing improper sliding operation of the slider.

Furthermore, the non-magnetic body is made of a thin stainless steel to improve a magnetic efficiency. Thus, if a wall thickness of the non-magnetic body is increased to improve strength of the non-magnetic body, the magnetic efficiency is reduced. Because of this, the non-magnetic body needs to have the thin wall in order to provide stable attractive force in the slider although it causes an increased possibility of damaging the non-magnetic body by the friction generated between the slider and the non-magnetic body. In order to reduce the friction between the slider and the non-magnetic body, the taper can be removed from the tapered distal end of the slider. However, the removal of the taper from the tapered distal end of the slider causes reduction of the stable attractive force in the slider.

Furthermore, Japanese Unexamined Patent Publication number 61-244984 and German Unexamined Patent Publication No. 19504185 disclose another solenoid valve. The solenoid valve includes a valve member, which is reciprocated together with a slider to open and close fluid passages or to increase and decrease a flow of fluid in the fluid passages.

Each solenoid valve disclosed in Japanese Unexamined Patent Publication number 61-244984 and German Unexamined Patent Publication No. 19504185 includes a relief passage provided in the slider. The relief passage communicates between spaces, which are arranged adjacent to opposite axial ends of the slider, respectively. Thus, the communication passage can restrain development of an excessive pressure difference between the spaces and allows smooth axial movement of the slider.

Specifically, Japanese Unexamined Patent Publication No. 61-244984 discloses the relief passage in a form of a spiral groove, which extends along an outer peripheral surface of the slider between the axial ends of the slider. German Unexamined Patent Publication No. 19504185 discloses the relief passage in a form of an axial passage, which extends between the axial ends of the slider near an outer peripheral surface of the slider. With such relief passages, it is possible to restrain generation of the excessive pressure difference between the spaces provided on opposite axial ends of the slider, respectively.

However, the relief passage disclosed in Japanese Unexamined Patent Publication No. 61-244984 and the relief passage disclosed in German Unexamined Patent Publication No. 19504185 are both provided at or near the outer peripheral surface of the slider, so that a magnetic resistance in the slider, which constitutes part of a magnetic circuit, is increased, and thus a magnetic permeability of the slider is reduced, causing a reduction in magnetic attractive force for attracting the slider.

SUMMARY OF THE INVENTION

The present invention addresses the above disadvantages. Thus, it is an objective of the present invention to provide a solenoid valve, which provides improved magnetic attractive force for attracting a slider. It is another objective of the present invention to provide a solenoid valve capable of reducing a chance of introducing debris and dust between a slider and a non-magnetic body without causing a reduction in magnetic attractive force for attracting the slider.

To achieve the objective of the present invention, there is provided a solenoid valve including a slider, a spring, a coil, a first stator segment, a second stator segment and a non-magnetic body. The slider is axially reciprocable. The spring provides urging force for urging the slider in a first axial direction of the solenoid valve. The coil generates magnetomotive force for attracting the slider in a second axial direction opposite to the first axial direction. The first stator segment includes an attracting portion and a boss portion. The attracting portion is axially opposed to the slider and attracts the slider in the second axial direction upon generation of the magnetomotive force by the coil. The boss portion axially protrudes from an outer peripheral side of the attracting portion toward the slider. The boss portion includes a tapered outer peripheral surface and a tapered inner peripheral surface. The second stator segment forms a magnetic circuit in cooperation with the slider and the first stator segment. The second stator segment includes a tubular portion. The tubular portion of the second stator segment is axially spaced from the boss portion and is at least partially placed radially outward of the slider. The non-magnetic body is at least partially placed radially inward of the tubular portion of the second stator segment to slidably support the slider therein.

In the above arrangement, the slider can be replaced with a slider, which is axially reciprocable and includes a communication passage that extends through the slider generally along a central axis of the slider. The communication passage of the slider is communicated with at least one first side space located on first axial side of the slider and is also communicated with at least one second side space located on second axial side of the slider. Furthermore, the first stator segment of the above arrangement can be replaced with a first stator segment, which includes an attracting portion. The attracting portion is axially opposed to the slider and attracts the slider in the second axial direction upon generation of the magnetomotive force by the coil. Also, the second stator segment can be replaced with a second stator segment, which forms a magnetic circuit in cooperation with the slider and the first stator segment and includes a tubular portion. The tubular portion of the second stator segment is at least partially placed radially outward of the slider.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
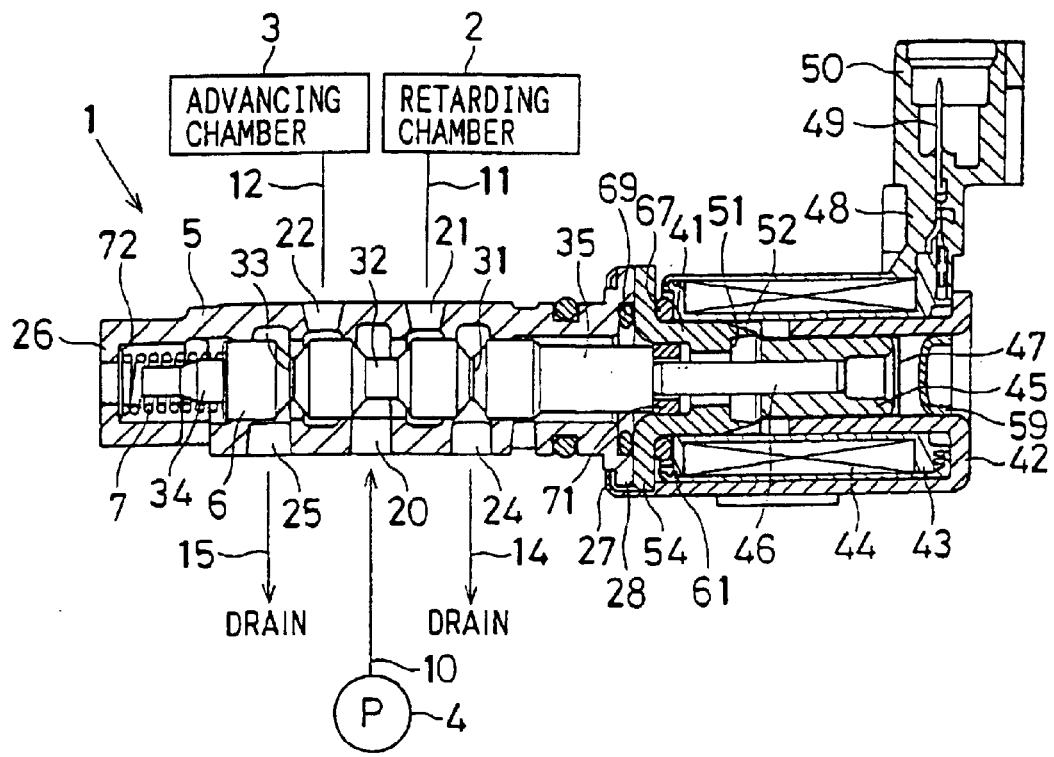
FIG. 1 is a schematic cross-sectional view of a solenoid-operated oil pressure control valve according to a first embodiment of the present invention.
Figure 2:
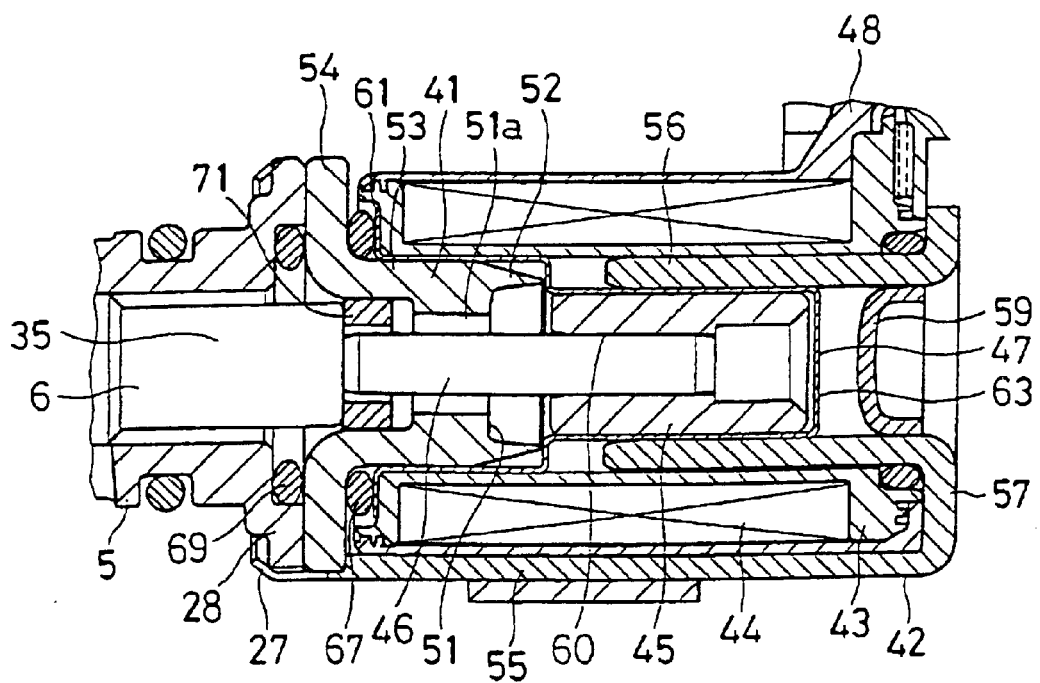
FIG. 2 is an enlarged partial cross sectional view of the solenoid-operated oil pressure control valve.

A first embodiment of the present invention will be described with reference to FIGS. 1 to 5. FIG. 1 is a schematic cross-sectional view of a solenoid-operated oil pressure control valve 1. FIG. 2 is an enlarged cross-sectional view of a main feature of the control valve 1.

The control valve 1 of the present embodiment is a solenoid valve (Oil Control Valve or simply abbreviated as OCV), which can selectively supplies and drains oil relative to a retarding oil pressure chamber 2 and an advancing oil pressure chamber 3 of a linearly variable valve timing adjusting system. The variable valve timing adjusting system linearly changes opening timing and closing timing (valve timing) of a corresponding intake valve (not shown) arranged, for example, in a cylinder head of a four cycle reciprocating engine (internal combustion engine), such as a double overhead camshaft (DOHC) engine (hereinafter, simply referred to as the engine).

The variable valve timing adjusting system includes a timing rotor (not shown), an intake camshaft (not shown), an intake variable valve timing mechanism, a hydraulic system circuit and an engine control system (hereinafter, simply referred to as ECU). The timing rotor acts as a housing member, which is rotated by a crank shaft (drive shaft) of the engine. The intake camshaft acts as a driven shaft, which is rotatably arranged relative to the timing rotor. The intake variable valve timing mechanism includes a vane rotor (not shown). The vane rotor acts as a vane member, which is secured to the intake camshaft and is rotatably received in the timing rotor. The hydraulic system circuit selectively supplies and drains the oil pressure relative to the retarding oil pressure chamber 2 and the advancing oil pressure chamber 3 of the intake variable valve timing mechanism. The ECU controls the control valve 1 arranged in the hydraulic system circuit.

The hydraulic system circuit includes a first oil supply passage (oil passage on the retarding oil pressure chamber side) 11 and a second oil supply passage (oil passage on the advancing oil pressure chamber side) 12. The first oil supply passage 11 supplies and drains the oil pressure relative to the retarding oil pressure chamber 2. The second oil supply passage 12 supplies and drains the oil pressure relative to the advancing oil pressure chamber 3. The first and second oil supply passages 11, 12 are formed in the cylinder head of the engine and also act as drain oil passages for draining oil from the retarding oil pressure chamber 2 and the advancing oil pressure chamber 3, respectively.

A pressurized oil supply passage (oil passage on the oil pressure source side) 10 and first and second oil drain passages (drain side oil passages) 14, 15 are connected to the first and second oil supply passages 11, 12 through oil passages formed in the control valve 1. The first oil drain passage 14 is the oil drain passage on the retarding oil pressure chamber side for draining the oil from the retarding oil pressure chamber 2. The second oil drain passage 15 is the oil drain passage on the advancing oil pressure chamber side for draining the oil from the advancing oil pressure chamber 3.

An oil pump (oil pressure source) 4 is inserted in the pressurized oil supply passage 10. The oil pump 4 suctions engine oil (acting as working fluid) from an oil pan (drain), which temporarily stores the engine oil, and discharges the oil to various portions of the engine. Outlet ends of the first and second oil drain passages 14, 15 are communicated to the oil pan. The oil pump 4 is rotated synchronously with the crankshaft of the engine to pump the oil toward the various portions of the engine in the amount that is proportional to an engine speed.

The control valve 1 includes a valve portion and an electromagnetic drive portion. The valve portion supplies and drains the oil pressure of the oil pump 4 relative to the retarding oil pressure chamber 2 and the advancing oil pressure chamber 3 of the variable valve timing mechanism by reciprocating a spool (acting as a valve member) 6 within a sleeve 5 (acting as a valve housing). The electromagnetic drive portion generates a magnetic attractive force when electric current is supplied thereto. The control valve 1 is controlled based on a drive electric current supplied from the ECU to selectively connect the first and second oil supply passages 11, 12 to the pressurized oil supply passage 10 and the first and second oil drain passages 14, 15.

The valve portion includes the cylindrical sleeve 5 and the spool 6. The sleeve 5 is arranged between the first and second oil supply passages 11, 12 and the pressurized oil supply passage 10 and the first and second oil drain passages 14, 15. The spool 6 is slidably received in the sleeve 5. In the present embodiment, a spring 7 is provided between a distal end of the sleeve 5 and a distal end side of the spool 6. The spring 7 acts as a slider urging means for generating an urging force for urging the spool 6 in a first axial direction (right direction in FIG. 1) toward the electromagnetic drive portion, i.e., toward a maximum retarded angular position side.

An input port (supply port) 20 is formed at the axial center of the peripheral wall (lower side in FIG. 1) of the sleeve 5 and is communicated with the pressurized oil supply passage 10 provided on the oil pump 4 side. A retarding port (first opening) 21 is formed in the peripheral wall (upper side in FIG. 1) of the sleeve 5 and is communicated with the first oil supply passage 11 on the retarding oil chamber 2 side. Furthermore, an advancing port (second opening) 22 is formed in the peripheral wall (upper side in FIG. 1) of the sleeve 5 and is communicated with the second oil supply passage 12 on the advancing oil chamber 3 side. A first and second drain ports (first and second drain opening) 24, 25 are formed in the peripheral wall (lower side in FIG. 1) of the sleeve 5 on the right and left sides of the input port 20 and are communicated with the first and second oil drain passages 14, 15, respectively. An annular front wall portion 26 is formed in the one axial end (distal end) of the sleeve 5. A flange portion 28 is formed on the other axial end of the sleeve 5. The flange portion 28 of the sleeve 5 is secured to a swaging portion 27 (described later) of the electromagnetic drive portion.

The spool 6 is supported in the sleeve 5 in an axially reciprocable manner. Furthermore, the spool 6 is coaxial with a plunger 45 (described later) and a shaft 46 (described later) of the electromagnetic drive portion. When an axial force applied from the electromagnetic drive portion to the spool 6 is increased to overcome the urging force (spring force) of the spring 7 exerted in the first axial direction (right direction in FIG. 1) of the control valve 1, the spool 6 is moved in a second axial direction (left direction in FIG. 1) opposite to the first axial direction. Furthermore, when the urging force (spring force) of the spring 7 overcomes the axial force applied from the electromagnetic drive portion to the spool 6, the spool 6 is urged by the spring 7 in the first axial direction (right direction in FIG. 1).

First to fourth land portions are axially arranged along the outer peripheral surface of the spool 6 from the right end to the left end in FIG. 1. A first recessed oil passage 31 is circumferentially formed around the outer peripheral surface (between the first land portion and the second land portion) of the spool 6. A second recessed oil passage 32 is circumferentially formed around the outer peripheral surface (between the second land portion and the third land portion) of the spool 6. A third recessed oil passage 33 is circumferentially formed around the outer peripheral surface (between the third land portion and the fourth land portion) of the spool 6. A small diameter portion 34, which has an outer diameter smaller than that of the fourth land portion, is formed in the distal end (left end in FIG. 1) of the spool 6. The spring 7 is arranged around an outer peripheral surface of the small diameter portion 34. A connecting portion 35, which has an outer diameter smaller than that of the first land portion, is formed in a rear end (right end in FIG. 1) of the spool 6.

With reference to FIGS. 1 and 2, the electromagnetic drive portion includes a stator core 41, a yoke 42, a solenoid coil (coil) 44, a plunger 45, the shaft 46 and a plunger guide 47. The stator core 41 acts as a first stator segment. The yoke 42 acts as a second stator segment. The solenoid coil 44 is wound around a coil bobbin 43. The plunger 45 acts as a slider (moving core), which is attracted and thus is moved in the second axial direction (left direction in FIG. 1) by the magnetomotive force of the solenoid coil 44. The shaft 46 axially moves together with the plunger 45. The plunger guide 47 receives the plunger 45 in a reciprocable manner. The plunger 45 has a communication passage (not shown). The communication passage of the plunger 45 communicates between spaces, which are arranged adjacent to axial ends of the plunger 45, respectively, to allow smooth movement of the plunger 45.

The stator core 41 is made of a magnetic material to form part of a magnetic circuit in corporation with the plunger 45 and the yoke 42. As shown in FIGS. 1 and 2, the stator 41 includes an annular attracting portion 51, a tapered boss portion 52, a cylindrical wall portion 53 and an annular flange portion 54. The attracting portion 51 attracts the plunger 45 in the second axial direction. The attracting portion 51 has a receiving hole 51a, which axially extends through the attracting portion 51 and receives the shaft 46. The boss portion 52 is formed integrally with the attracting portion 51 at an outer peripheral side of the attracting portion 51. The boss portion 52 is axially spaced from a distal end surface of an inner tubular portion 56 (described later) of the yoke 42 for a predetermined distance. The cylindrical wall portion 53 has a cylindrical shape and extends in the second axial direction from the outer peripheral side of the attracting portion 51. The flange portion 54 radially, outwardly extends from one end of the cylindrical wall portion 53.

The boss portion 52 of the stator core 41 is tapered such that an outer diameter of the boss portion 52 progressively decreases from the outer peripheral side of the attracting portion 51 toward the inner tubular portion 56, and an inner diameter of the boss portion 52 increases from the outer peripheral side of the attracting portion 51 toward the inner tubular portion 56. The above described configuration of the boss portion 52 reduces leakage of a magnetic flux from the stator core 41 to an outer peripheral surface of the plunger 45 and increases the amount of the magnetic flux from the stator core 41 to the opposed axial end of the plunger 45. Specifically, the outer peripheral surface of the boss portion 52 is formed as an outer taper 52a, which is tapered at a predetermined taper angle. An inner peripheral surface of the boss portion 52 is formed as an inner taper 52b, which is tapered at a predetermined taper angle.

Figure 3A:
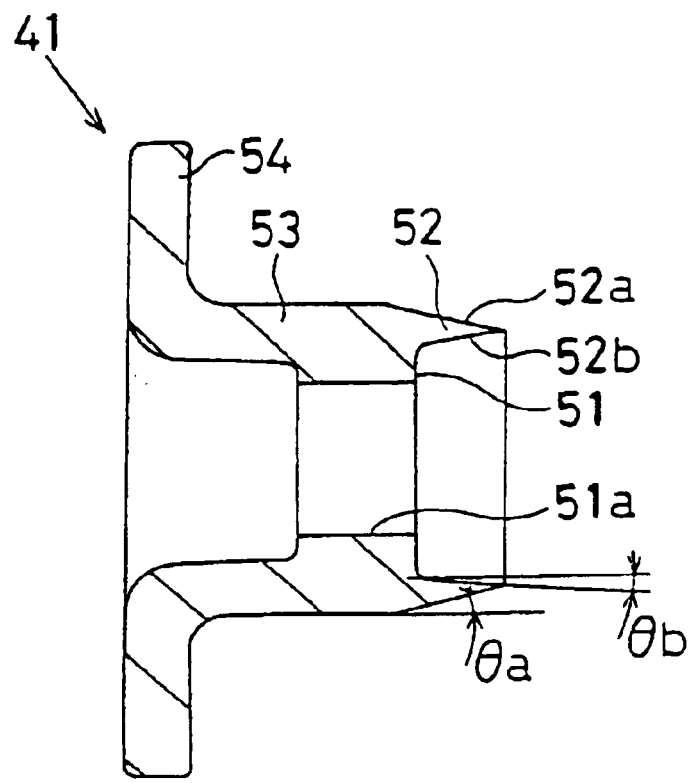
FIG. 3A is a cross-sectional view of a stator core of the solenoid-operated oil pressure control valve.
Figure 3B:
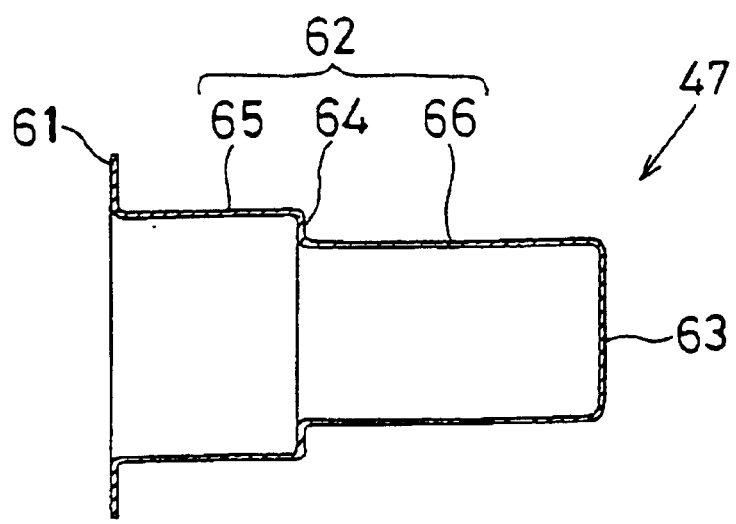
FIG. 3B is a cross-sectional view of a plunger guide of the solenoid-operated oil pressure control valve.
Figure 4:
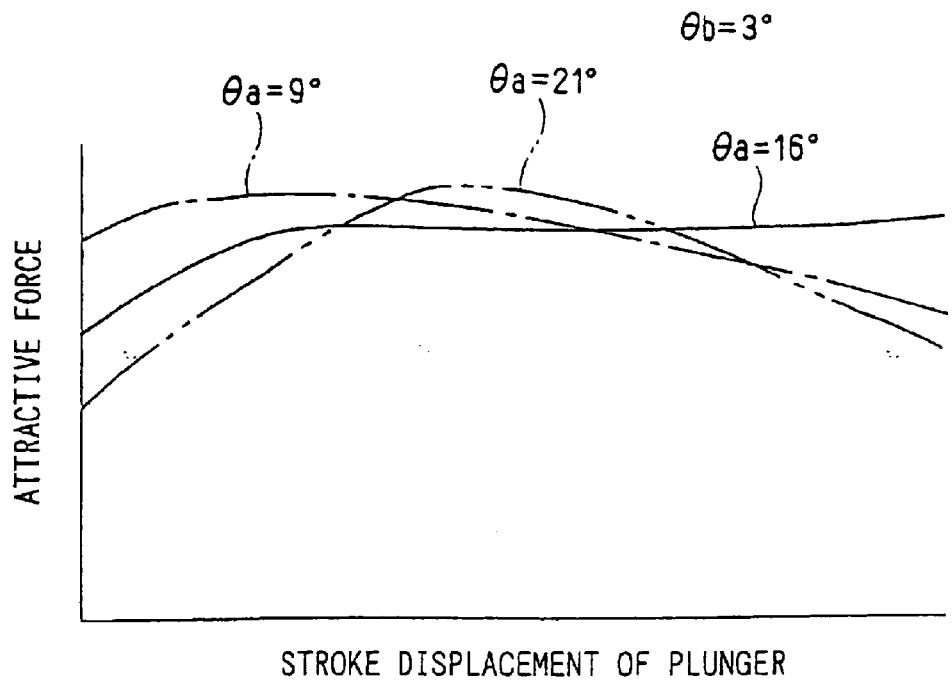
FIG. 4 is a graph showing a relationship between an attractive force, which is generated between a stator core and a plunger, and a stroke displacement of the plunger for various outer taper angles of a boss portion of the stator core.
Figure 5:
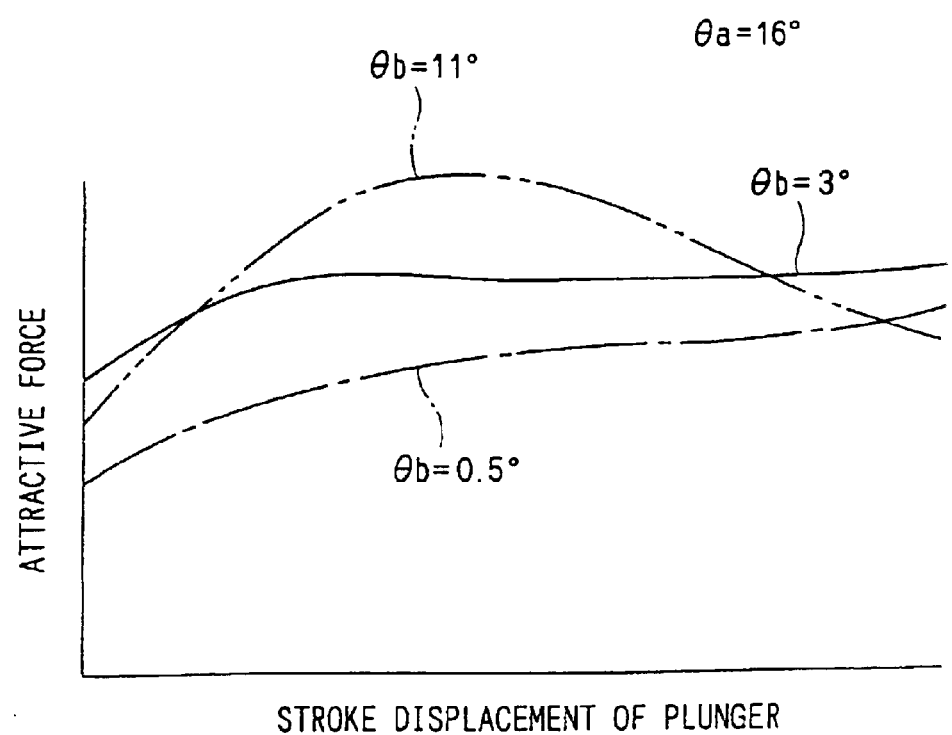
FIG. 5 is a graph showing a relationship between an attractive force, which is generated between a stator core and a plunger, and a stroke displacement of the plunger for various inner taper angles of the boss portion of the stator core.

It has been experimentally found that the attractive force, which is generated upon energization of the solenoid coil 44, between the plunger 45 and the stator core 41 (more specifically, the attracting portion 51 and the boss portion 52 of the stator core 41) can be made substantially constant irrespective of a stroke displacement of the plunger 45 when the taper angle (outer taper angle) of the outer taper 52*a* is set to a predetermined taper angle θa, and the taper angle (inner taper angle) of the inner taper 52*b* is set to a predetermined taper angle θb. Here, the stroke displacement is defined as a displacement (or distance) of the plunger 45 from its initial position (shown in FIGS. 1 and 2) where the electric power is not supplied to the solenoid coil 44. Specifically, with reference to FIGS. 3A, 4 and 5, the outer taper angle of the outer taper 52*a* of the boss portion 52 is set to the taper angle ea (e.g., 11 to 18 degrees), which is defined between the outer peripheral surface of the outer taper 52*a* and a first imaginary axial line that extends parallel to a central axis of the stator core 41 from a base end of the outer taper 52*a*, as shown in FIG. 3A. Furthermore, the inner taper angle of the inner taper 52*b* of the boss portion 52 is set to the taper angle θb (e.g., 1 to 8 degrees), which is defined between the inner peripheral surface of the inner taper 52*b* and a second imaginary axial line that extends parallel to the central axis of the stator core 41 from a base end of the inner taper 52*b*, as shown in FIG. 3A. The outer taper angle θa of the outer taper 52*a* is preferrably about 16 degrees, and the inner taper angle θb of the inner taper 52*b* is preferrably about 3 degrees. Furthermore, it should be noted that the graph shown in FIG. 4 is obtained at a fixed inner taper angle θb=3 degrees, and the graph shown in FIG. 5 is obtained at a fixed outer taper angle θa=16 degrees.

With reference to FIGS. 1 and 2, the yoke 42 is made of a magnetic material and forms part of the magnetic circuit in corporation with the plunger 45 and the stator core 41. The yoke 42 includes a cylindrical outer tubular portion 55, the cylindrical inner tubular portion 56 and an annular connecting portion 57. The outer tubular portion 55 cover outer peripheral portions of the coil bobbin 43 and of the solenoid coil 44. The inner tubular portion 56 is arranged between the outer peripheral surface of the plunger 45 and an inner peripheral surface of the coil bobbin 43. The connecting portion 57 connects between the outer tubular portion 55 and the inner tubular portion 56. A seal member 59 is installed to a rear end of the inner tubular portion 56 of the yoke 42 to close an opening of the inner tubular portion 56.

With reference to FIGS. 1 and 2, the coil bobbin 43 is a molded primary resin product formed as one cylindrical body. The coil bobbin 43 includes a cylindrical portion and flange portions. The solenoid coil 44 is wound around the cylindrical portion of the coil bobbin 43 for a predetermined number of turns. The flange portions of the coil bobbin 43 are formed at opposite ends of the cylindrical portion of the coil bobbin 43, respectively. When the drive current is supplied to the solenoid coil 44, the solenoid coil 44 generates the magnetomotive force for attracting the plunger 45 toward the attracting portion 51 of the stator core 41 in the second axial direction (in the stroke direction). At this time, the displacement of the plunger 45 from its initial position is determined based on the degree of the magnetomotive force. Furthermore, a connector 50 is integrally molded with an exposed portion of a molded resin member (molded secondary resin product) 48, which is exposed from the yoke 42. Terminals (externally connecting terminals) 49 for electrically connecting the solenoid coil 44 to a vehicle battery are insert molded into the connector 50.

As shown in FIGS. 1 and 2, the plunger 45 is the cylindrical magnetic body made of a magnetic material and has an axial hole 60 therein. A rear end of the shaft 46 is securely press fitted within the axial hole 60. Furthermore, as shown in FIGS. 1 and 2, the shaft 46 is arranged coaxially with the plunger 45 and the spool 6 of the valve portion and connects between the spool 6 and the plunger 45. A distal end of the shaft 46 abuts against the connecting portion 35 arranged at the rear end (right end in FIG. 1) of the spool 6 of the valve portion. When the plunger 45 is attracted to the attracting portion 51 of the stator core 41 by the magnetomotive force generated in the solenoid coil 44 upon energization of the solenoid coil 44, the spool 6 of the valve portion is moved together with the plunger 45 and the shaft 46 in the second axial direction (left direction in FIG. 1). Furthermore, when the magnetomotive force of the solenoid coil 44 is seized by seizing the supply of the electric power to the solenoid coil 44, the spool 6 is moved together with the plunger 45 and the shaft 46 in the first axial direction (right direction in FIG. 1) by the urging force of the spring 7.

The plunger guide 47 is a non-magnetic body (cup-shaped member) made of a non-magnetic material, such as a thin stainless steel. As shown in FIGS. 1 to 3B, the plunger guide 47 is formed into a predetermined cylindrical form having a closed base end (cup-shape) through, for example, a press operation of the non-magnetic material. The plunger guide 47 includes a flange portion 61, a cylindrical peripheral wall portion 62 and a base wall portion 63. The flange portion 61 is clamped between the flange portion of the coil bobbin 43 and the flange portion 54 of the stator core 41. The peripheral wall portion 62 extends from an inner peripheral end of the flange portion 61 toward the rear end in the axial direction. The base wall portion 63 covers the rear end of the plunger 45.

An outer diameter of a front part or large diameter portion 65 of the peripheral wall portion 62, which is located on the front side of a step portion 64 of the peripheral wall 62, is larger than that of a rear part or small diameter portion 66 of the peripheral wall portion 62, which is located on the rear side of the step 64 of the peripheral wall 62. The large diameter portion 65 of the peripheral wall 62 is arranged between an outer peripheral surface of the cylindrical wall portion 53 of the stator core 41 and an inner peripheral surface of the cylindrical portion of the coil bobbin 43. The small diameter portion 66 of the peripheral wall 62 is arranged between an inner peripheral surface of the inner tubular portion 56 of the yoke 42 and the outer peripheral surface of the plunger 45. The step portion 64, which connects between the large diameter portion 65 and the small diameter portion 66, radially extends across a space axially defined between the inner tubular portion 56 of the yoke 42 and the boss portion 52 of the stator core 41.

The flange portion 61 of the plunger guide 47 is connected to the flange portion 28 of the sleeve 5 in a fluid tight manner by swaging the swaging portion 27 formed in the left end of the outer tubular portion 55 of the yoke 42 in FIG. 1 against the flange portion 28 of the sleeve 5. A seal member 67, such as an O-ring, for restraining leakage of the oil is installed between the flange portion 61 of the plunger guide 47 and the flange portion 54 of the stator core 41. Furthermore, a seal member 69, such as an O-ring, for restraining leakage of the oil is installed between the flange portion 54 of the stator core 41 and the flange portion 28 of the sleeve 5.

The axial movement of the spool 6, the plunger 45 and the shaft 46 in the first axial direction (right direction in FIG. 1) is limited when the rear end surface (right end surface in FIG. 1) of the spool 6 abuts against a maximum retarded angular position stopper 71. The maximum retarded angular position stopper 71 is formed in an annular shape and is secured to an inner peripheral surface of the stator core 41. Furthermore, the axial movement of the spool 6, the plunger 45 and the shaft 46 in the second axial direction (left direction in FIG. 1) is limited when the front end surface (left end surface in FIG. 1) of the spool 6 abuts against a maximum advanced angular position stopper 72. The maximum advanced angular position stopper 72 is formed in an annular shape and is secured to the distal end of the sleeve 5.

The ECU determines the current operating state of the engine based on signals transmitted from a crank angle sensor for measuring an engine speed, an engine load sensor, and an airflow meter for measuring the amount of intake air flow. Furthermore, based on the signals transmitted from the crank angle sensor and the cam angle sensor, the ECU determines a relative rotational position of the timing rotor (housing member) with respect to the intake camshaft and the vane rotor (vane member) and also determines an intermediate locking position of the intake camshaft and the vane rotor. The ECU can linearly change the controlled state of the solenoid-operated oil pressure control valve 1 (i.e., a stroke of the spool 6, the plunger 45 and the shaft 46) by applying the corresponding drive current to the solenoid coil 44 of the electromagnetic drive portion to achieve the desired appropriate opening timing and closing timing of the corresponding intake valve and/or exhaust valve of the engine based on the engine speed and the engine load.

Operation of the solenoid-operated oil pressure control valve 1 will be briefly described with reference to FIGS. 1 and 2.

When the drive current is supplied to the solenoid coil 44 of the electromagnetic drive portion, the magnetic flux is generated around the solenoid coil 44. The magnetic flux passes through the yoke 42, the plunger 45, and the stator core 41. Since the non-magnetic plunger guide 47 is placed between the plunger 45 and the yoke 42, the plunger 45 and the yoke 42 do not contact each other, and the attractive force is exerted in the plunger 45 to pull the plunger 45 toward the attracting portion 51 of the stator core 41. When the plunger 45 is moved in the second axial direction, the axial force is conducted from the plunger 45 to the spool (valve element) 6 through the shaft 46. At this time, because of the urging force of the spring 7 provided in the valve portion, the spool 6 can be retained at any axial position relative to the sleeve 5. That is, the opening timing and the closing timing of the intake valve can be linearly changed.

Next, the maximum retarded angular position mode will be described.

When the drive current applied to the solenoid 44 is equal to or less than its minimum value, the magnetomotive force of the solenoid coil 44 becomes equal to or less than its minimum value. Thus, the plunger 45 is not attracted toward the attracting portion 51 of the stator core 41. At this time, the position of the spool 6 of the spool control valve and the plunger 45 is changed to (or set to) the maximum retarded angular position. Thus, the input port 20, which is communicated with the pressurized oil supply passage 10 on the oil pump 4 side, and the retarding port 21, which is communicated with the first oil supply passage 11 on the retarding oil pressure chamber 2 side, are connected to each other through the second oil passage 32, which is provided in the outer peripheral surface of the spool 6. Furthermore, the advancing port 22, which is communicated with the second oil supply passage 12 on the advancing oil pressure chamber 3 side, and the second drain port 25, which is communicated with the second oil drain passage 15 on the drain side, are connected to each other through the third oil passage 33 provided in the outer peripheral surface of the spool 6. Thus, the controlled state of the solenoid-operated oil pressure control valve 1 is changed to (or set to) the maximum retarded angular position mode (FIG. 1) where the oil pressure of the oil pump 4 is supplied to the retarding oil pressure chamber 2 of the intake variable valve timing mechanism while the oil contained in the advancing oil pressure chamber 3 is drained.

Since the oil is supplied to the retarding oil pressure chamber 2, and the oil contained in the advancing oil pressure chamber 3 is drained, the vane member is rotated relative to the housing member of the intake variable valve timing mechanism toward the maximum retarded angular position side by the oil pressure supplied in the retarding oil pressure chamber 2. Thus, the opening timing and the closing timing (valve timing) of the intake valve of the engine can be largely retarded, for example, during the idling period of the engine. As a result, it is possible to eliminate an overlap period (i.e., the period during which the intake valve and the exhaust valve are both simultaneously opened) to stabilize the combustion state of the engine. Furthermore, during the operation of the engine at the high speed and high load, the maximum output power of the engine can be achieved by retarding the closing timing of the intake valve to the appropriate timing.

Now, the maximum advanced angular position mode will be described.

When the drive electric current applied to the solenoid 44 is equal to its maximum valve, the magnetomotive force of the solenoid coil 44 becomes its maximum value. Thus, the plunger 45 is attracted to the attracting portion 51 of the stator core 41. At this time, the position of the spool 6 and the plunger 45 is changed to (or set to) the maximum advanced angular position. Thus, the retarding port 21, which is communicated with the first oil supply passage 11 on the retarding oil pressure chamber 2 side, and the first drain port 24, which is communicated with the first oil drain passage 14 on the drain side, are connected to each other through the first oil passage 31 arranged in the outer peripheral surface of the spool 6. Simultaneously, the input port 20, which is communicated with the pressurized oil supply passage 10 on the oil pump 4 side, and the advancing port 22, which is communicated with the second oil supply passage 12 on the advancing oil pressure chamber 3 side, are connected to each other through the second oil passage 32 arranged in the outer peripheral surface of the spool 6. Thus, the controlled state of the solenoid-operated oil pressure control valve 1 is changed to (or set to) the maximum advanced angular position mode where the oil pressure of the oil pump 4 is supplied to the advancing oil pressure chamber 3 of the intake variable valve timing mechanism while the oil contained in the retarding oil pressure chamber 2 is drained.

Since the oil is supplied to the advancing oil pressure chamber 3, and the oil is drained from the retarding oil pressure chamber 2, the vane member is rotated relative to the housing member toward the maximum advanced angular position side by the oil pressure supplied in the advancing oil pressure chamber 3. Thus, the opening timing and the closing timing (valve timing) of the intake valve of the engine can be largely advanced, for example, during the engine operation at the middle speed and the middle load to increase the overlap period, so that an amount of self EGR (residual gas in the corresponding combustion chamber) is increased to reduce the combustion temperature. As a result, noxious components (HC and NOx) contained in the emissions are reduced. In this case, pumping losses in the engine are also reduced, and thus the fuel consumption is reduced.

As described above, in the solenoid-operated oil pressure control valve 1, the distal end (located on the stator core 41 side) of the plunger 45 of the electromagnetic drive portion has substantially no taper unlike the prior art. Thus, the friction is reduced between the plunger 45, which is made of the magnetic material, and the plunger guide 47, which is made of the non-magnetic material and slidably supports the plunger 45 in the axially reciprocable manner. Also, the chance of introducing the debris and dusts between the plunger 45 and the plunger guide 47 is reduced. As a result, the wall thickness of the plunger guide 47 made of the thin stainless steel can be minimized to improve the magnetic efficiency. Therefore, the magnetic efficiency of the magnetic circuit, which is formed of the stator core 41, the plunger 45 and the yoke 42, is improved. Thus, the stable effective attractive force is exerted in the plunger 45 to attract the plunger 45 toward the attracting portion 51 of the stator core 41 (in the second axial direction, i.e., in the left direction in FIG. 1).

Furthermore, when the electric current is supplied to the solenoid coil 44 of the electromagnetic drive portion, the magnetomotive force is generated in the solenoid coil 44. Due to the magnetomotive force of the solenoid coil 44, the attractive force is exerted in the plunger 45 to attract the plunger 45 toward the attracting portion 51 of the stator core 41 (in the second axial direction, i.e., in the left direction in FIG. 1). The outer peripheral surface and the inner peripheral surface of the boss portion 52 are tapered. That is, the outer taper 52a, which is tapered at the taper angle $\theta a = 11–18$ degrees, is provided on the outer peripheral surface of the boss portion 52 of the stator core 41. Furthermore, the inner taper 52b, which is tapered at the taper angle $\theta b = 1–8$ degrees, is provided on the inner peripheral surface of the boss portion 52 of the stator core 41. With this configuration of the boss portion 52 of the stator core 41, leakage of the magnetic flux to the outer peripheral surface of the plunger 45 is reduced, and the amount of the magnetic flux provided between the distal end of the plunger 45 and the attracting portion 51 of the stator core 41 is increased, as shown in FIGS. 4 and 5. Thus, the stable attractive force is exerted in the plunger 45 to attract the plunger 45 toward the attracting portion 51 of the stator core 41 (in the second axial direction) without requiring an increase in an outer diameter and/or an axial length of the solenoid-operated oil pressure control valve 1. As a result, controllability of the solenoid-operated oil pressure control valve 1 can be further improved.

Furthermore, even when the plunger 45 approaches the attracting portion 51 of the stator core 41, a reduction in the attractive force can be restrained, as shown in FIGS. 4 and 5. Thus, the stable attractive force can be provided in the plunger 45 to attract the plunger 45 toward the attracting portion 51 of the stator core 41 (in the second axial direction). The tapered inner peripheral surface and the tapered outer peripheral surface of the boss portion 52 of the stator core 41 of the electromagnetic drive portion allow manufacturing of the stator core 41 by a cold press operation, in which the tapered inner peripheral surface and the tapered outer peripheral surface of the boss portion 51 form a draft. In comparison to the stator core manufactured by a cutting operation, the stator core 41 manufactured by the cold press operation allows an improvement in productivity of the stator core 41 and also a reduction of the manufacturing costs of the stator core 41. Thus, it is possible to provide the relatively small solenoid-operated oil pressure control valve 1 at the lower manufacturing costs.

The above embodiment can be modified as follows.

In the above embodiment, the invention is applied to the solenoid-operated oil pressure control valve 1, which selectively supplies and drains the oil pressure relative to the retarding oil pressure chamber 2 and the advancing oil pressure chamber 3 of the intake variable valve timing mechanism that linearly changes the opening timing and the closing timing of the intake valve of the engine. The present invention can be also applied to a solenoid-operated oil pressure control valve 1, which selectively supplies and drains oil pressure relative to a retarding oil pressure chamber and an advancing oil pressure chamber of an exhaust variable valve timing mechanism that linearly changes opening timing and closing timing of an exhaust valve of an engine. Furthermore, the present invention can be applied to a solenoid-operated oil pressure control valve, which selectively supplies and drains oil pressure relative to each retarding oil pressure chamber and each advancing oil pressure chamber of an intake/exhaust variable valve timing mechanism that linearly changes opening timing and closing timing of each of an intake valve and an exhaust valve of an engine.

In the above embodiment, the solenoid valve of the present invention is used as the solenoid-operated oil pressure control valve 1, which selectively supplies and drains the oil pressure of the oil pump (oil pressure source) 4 relative to the retarding oil pressure chamber 2 and the advancing oil pressure chamber 3 of the intake variable valve timing mechanism. However, the solenoid valve of the present invention can be also uses as a solenoid-operated oil pressure control valve, which selectively supplies and drains oil pressure (line pressure) of an oil pump (oil pressure source) relative to a plurality of hydraulic servos that drive a hydraulic engaging element of an automatic transmission (e.g., a hydraulic multiple disk clutch, a hydraulic multiple disk brake, a band brake). Also, the solenoid valve of the present invention can be used as a solenoid-operated fluid passage switching valve, which switches a fluid passage for conducting fluid, such as air, oil or water.

In the above embodiment, the stator core 41 is provided as the first stator segment axially arranged on the valve portion side, and the yoke 42 is provided as the second stator segment axially arranged on the side opposite to the valve portion side. However, the yoke can be provided as the first stator segment axially arranged on the valve portion side, and the stator core can be provided as the second stator segment axially arranged on the side opposite to the valve portion side. Furthermore, in the above embodiment, the solenoid valve of the present invention is the solenoid-operated oil pressure control valve 1, which has the valve portion that is the two-drain type spool valve having oil supply passages on its peripheral wall. However, the solenoid valve of the present invention can be a solenoid-operated oil pressure control valve, which has a valve portion that is a one-drain type hollow spool valve having oil supply passages on its peripheral wall. Furthermore, the solenoid valve of the present invention can be a solenoid-operated oil pressure control valve, which has a valve portion that is a one-drain type hollow spool valve having oil supply passages on its distal end wall.

(Second Embodiment)

An oil pressure control valve for a valve timing adjusting system of an internal combustion engine according to a second embodiment of the present invention will be described with reference to FIGS. 6 to 11.

Figure 6:
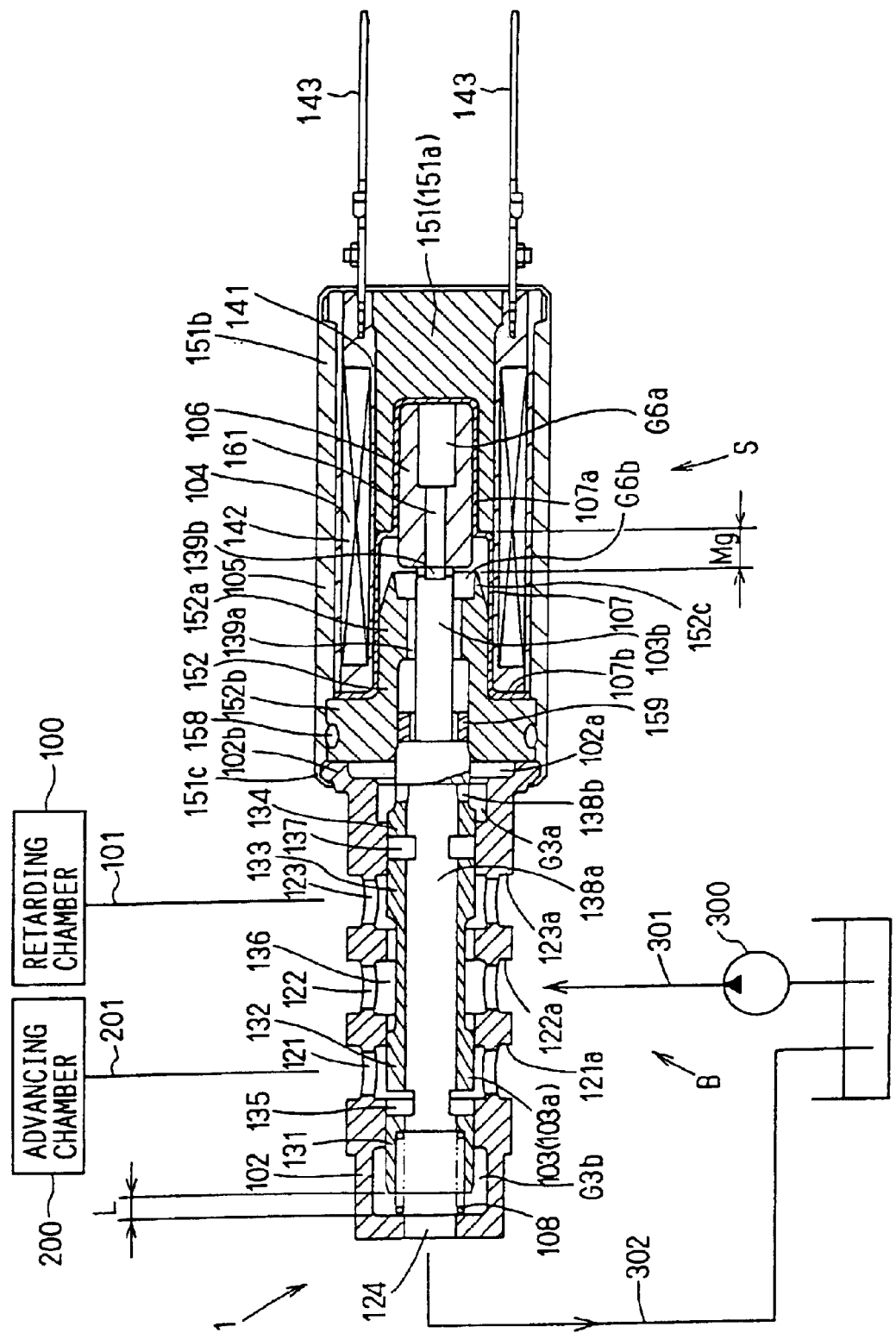
FIG. 6 is a cross-sectional view of a solenoid valve according to a second embodiment of the present invention.

With reference to FIG. 6, the oil pressure control valve 1 of the present embodiment is a solenoid valve (Oil Control Valve or simply abbreviated as OCV). The control valve 1 can selectively supplies and drains oil to a retarding oil pressure chamber 100 and an advancing oil pressure chamber 200 of the variable valve timing adjusting system. The variable valve timing adjusting system linearly changes opening timing and closing timing of a corresponding intake valve (not shown) arranged, for example, in a cylinder head of a four cycle reciprocating engine (internal combustion engine), such as a double overhead camshaft (DOHC) engine (hereinafter, simply referred to as the engine).

The variable valve timing adjusting system of the present embodiment includes a timing rotor (not shown), a variable valve timing mechanism, a hydraulic system circuit and an engine control system (hereinafter, referred to as ECU). The timing rotor acts as a housing member, which is rotated by a crank shaft (drive shaft) of the engine. The variable valve timing mechanism includes an intake camshaft (not shown), which acts as a driven shaft that is rotatably arranged relative to the timing rotor. The hydraulic system circuit selectively supplies and drains the oil pressure relative to the retarding oil pressure chamber 100 and the advancing oil pressure chamber 200 of the variable valve timing mechanism. The ECU controls the control valve 1 arranged in the hydraulic system circuit.

The hydraulic system circuit includes a first oil supply passage (oil passage on the retarding oil pressure chamber side) 101 and a second oil supply passage (oil passage on the advancing oil pressure chamber side) 201. The first oil supply passage 101 supplies and drains the oil pressure relative to the retarding oil pressure chamber 100. The second oil supply passage 201 supplies and drains the oil pressure relative to the advancing oil pressure chamber 200. The first and second oil supply passages 101, 201 are formed in the cylinder head of the engine and also act as drain oil passages for draining oil from the retarding oil pressure chamber 100 and the advancing oil pressure chamber 200, respectively.

A pressurized oil supply passage (oil supply passage on the oil pressure source side) 301 and an oil drain passage (oil passage on the drain side) 302 are connected to the first oil supply passage 101 and the second oil supply passage 201 through oil passages of the control valve 1.

An oil pump (oil pressure source) 300 is inserted in the pressurized oil supply passage 301. The oil pump 300 suctions engine oil (acting as working fluid) from an oil pan (drain), which temporarily stores the engine oil, and discharges the oil to various portions of the engine. An outlet end of the oil discharge passage 302 is communicated with the oil pan. The oil pump 300 is rotated synchronously with the crankshaft of the engine to pump the oil toward the various portions of the engine in the amount that is proportional to an engine speed.

Figure 7:
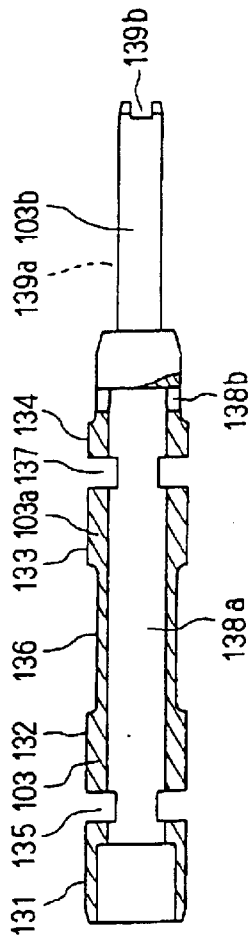
FIG. 7 is a partial cross-sectional view of a spool of the solenoid valve.

The oil pressure control valve 1 will be further described with reference to FIGS. 6 and 7.

The control valve 1 includes a spool control valve (hereinafter, referred to as the valve portion) B and an electromagnetic drive portion S. The valve portion B supplies and drains the oil pressure of the oil pump 300 relative to the retarding oil pressure chamber 100 and the advancing oil pressure chamber 200 of the variable valve timing mechanism by reciprocating a spool (acting as a valve member) 103 within a sleeve (acting as a valve housing) 102. The electromagnetic drive portion S generates magnetic attractive force when electric current is supplied to the electromagnetic drive portion S. The control valve 1 is controlled based on drive electric current supplied from the ECU to selectively connect the first and second oil supply passages 101, 201 to the pressurized oil supply passage 301 and the oil drain passage 302.

The valve portion B includes the cylindrical sleeve 102 and the spool 103. The sleeve 102 is arranged between the first and second oil supply passages 101, 201 and the pressurized oil supply passage 301 and the oil drain passage 302. The spool 103 is slidably received in the sleeve 102.

The sleeve 102 has an opening 102a at one axial end, which opposes the electromagnetic drive portion S. The opening 102a of the sleeve 102 allows a plunger (acting as a slider) 106 of the electromagnetic drive portion S to engage with the spool 103 (more specifically, a solid small diameter cylindrical portion 103b of the spool 103) to apply a drive force to the spool 103.

As shown in FIG. 6, a plurality of radial openings 121, 122, 123 penetrate through a peripheral wall of the sleeve 102 at predetermined positions and act as fluid passages for conducting the working fluid. More specifically, an input port (supply port) 122 is formed at the axial center of the peripheral wall of the sleeve 102 and is communicated with the pressurized oil supply passage 301 on the oil pump 300 side. A retarding port 123 is formed in the peripheral wall of the sleeve 102 on the right side of the input port 122 in FIG. 6 and is communicated with the first oil supply passage 101 on the retarding oil pressure chamber 100 side. An advancing port 121 is formed in the peripheral wall of the sleeve on the left side of the input port 122 in FIG. 6 and is communicated with the second oil supply passage 201 on the advancing oil pressure chamber 200 side. In the present embodiment, annular grooves 123a, 121a, 122a are formed in the peripheral wall of the sleeve 102 to communicate the retarding port 123, the advancing port 121 and the input port 122 to the first oil supply passage 101, the second oil supply passage 201 and the pressurized oil supply passage 301, respectively, irrespective of an install orientation of the control valve 1. A drain port 124 is formed in an axial end wall of the sleeve 102 on the side opposite to the electromagnetic drive portion S and is communicated with the oil drain passage 302.

The spool 103 includes a hollow large diameter cylindrical portion 103a and the solid small diameter cylindrical portion 103b. One end of the hollow large diameter cylindrical portion 103a, which is connected to the solid small diameter cylindrical portion 103b, is the closed solid end. The other end of the hollow large diameter cylindrical portion 103a is the open end and is communicated with the drain port 124 of the sleeve 102. The large diameter cylindrical portion 103a opens and closes the openings 121, 122, 123 of the sleeve 102. The small diameter cylindrical portion 103b abuts against the plunger 106 of the electromagnetic drive portion S. The large diameter cylindrical portion 103a is supported by an inner peripheral wall of the sleeve 102 in an axially reciprocable manner. The large diameter cylindrical portion 103a includes large diameter portions 131, 132, 133, 134 and grooves 135, 136, 137. The large diameter portions 131, 132, 133, 134 are also called land portions, which have an outer diameter that is substantially the same as an inner diameter of the sleeve 102. Adjacent large diameter portions 131, 132, 133, 134 are connected by the corresponding groove 135, 136, 137. More specifically, a first recessed oil passage 135 extends circumferentially around the outer peripheral wall of the spool 103 between the first land portion 131 and the second land portion 132. A second recessed oil passage 136 extends circumferentially around the outer peripheral wall of the spool 103 between the second land portion 132 and the third land portion 133. A third recessed oil passage 137 extends circumferentially around the outer peripheral wall of the spool 103 between the third land portion 133 and the fourth land portion 134.

The second oil passage 136 is always communicated with the pressurized oil supply passage 301 through the input port 122 and is selectively connected to the retarding port 123 or the advancing port 121 depending on the axial position of the spool 103. The first oil passage 135 and the third oil passage 137 of the spool 103 are communicated with the advancing port 121 and the retarding port 123 of the sleeve 102, respectively, depending on the axial position of the spool 103. The first oil passage 135 and the third oil passage 137 of the spool 103 are also directly communicated with a first drain passage (connecting passage) 138a, which axially extends in the large diameter cylindrical portion 103a of the spool 103 and penetrates through an end (left end in FIG. 6) of the large diameter cylindrical portion 103a.

The large diameter cylindrical portion 103a and the small diameter cylindrical portion 103b are coaxial with the plunger 106.

A spring 108 is provided between the axial end of the spool 103 and the opposed axial end of the sleeve 102 near the drain port 124. The spring 108 acts as a slider urging means for urging the spool 103 in a first axial direction of the valve 1 (right direction in FIG. 6) toward the electromagnetic drive portion S. When the electric power is not supplied to the electromagnetic drive portion S, the large diameter cylindrical portion 103a of the spool 103 abuts against a stopper 159 of a stator 105, which will be described in greater detail below. A maximum axial displacement L of the spool 103 is thus limited by the stopper 159 of the stator 105.

Further details of the spool 103 will be described later.

The electromagnetic drive portion S includes a solenoid coil 104, the stator 105, the plunger (acting as the slider) 106 and a plunger guide. (non-magnetic body) 107.

The solenoid coil 104 includes a bobbin 141 and a coil 142 wound around the bobbin 141. Ends of the coil 142 are electrically connected to terminals 143 to receive electric power. The terminals 143 are insert molded within a resin portion near the bobbin 141 or a yoke 151.

The stator 105 and the plunger 106 are made of a magnetic material and constitute a magnetic circuit. The stator 105 includes a yoke 151 and a stator core 152. The stator core 152 acts as a first stator segment, and the yoke 151 acts as a second stator segment.

The yoke 151 has an inner tubular portion 151a and an outer tubular portion 151b. The bobbin 141 and the coil 142 are received between the inner tubular portion 151a and the outer tubular portion 151b. The inner tubular portion 151a acts as an inner tube and is placed around an outer peripheral surface of the plunger 106 and is radially opposed to the plunger 106. The coil 142 is arranged radially inward of the outer tubular portion 151b. An attracting portion 152a of the stator core 152 is arranged radially inward of the coil 142. A flange portion 152b of the stator core 152 is formed integrally with the attracting portion 152a and has a larger outer diameter than the attracting portion 152a. The flange portion 152b of the stator core 152 directly contacts the outer tubular portion 151b. A swaging portion 151c, which acts as a connecting means, is formed at an end of the outer tubular portion 151b, which opposes the sleeve 102. The inner tubular portion 151a of the yoke 151 and the attracting portion 152a of the stator core 152 are axially opposed to each other, and a predetermined space Mg is provided between the inner tubular portion 151a of the yoke 151 and the attracting portion 152a of the stator core 152 in a reciprocating direction of the plunger 106. A radial thickness of a boss portion 152c formed at an axial end of the attracting portion 152a of the stator core 152 is progressively reduced toward the plunger 106.

The plunger 106 is a generally cylindrical body and is reciprocably received in the inner tubular portion 151a of the yoke 151 through the plunger guide 107 formed of a non-magnetic material, which will be described in greater detail below.

Details of the plunger 106 will be described in connection with the spool 103, which reciprocates together with the plunger 106.

The plunger guide 107 is formed of the non-magnetic material, such as a stainless steel and has a cup-shape. The plunger guide 107 includes a cylindrical portion 107a and a flange portion 107b. The cylindrical portion 107a has a closed base end, and the flange portion 107b acts as a connecting portion.

The plunger guide 107 is arranged inside the inner tubular portion 151a of the yoke 151. In other words, the yoke 151 is arranged outside the plunger guide 107. The attracting portion 152a of the stator core 152 is arranged inside the plunger guide 107.

The flange portion 107b of the plunger guide 107 is connected to the stator core 152 and the sleeve 102 in a fluid tight manner by an O-ring 158 by swaging the swaging portion 151c of the yoke 151 against a flange portion 102b of the sleeve 102 to urge the flange portion 152b of the stator core 152 and the flange portion 102b of the sleeve 102 together.

The plunger 106 and a reciprocating structure for reciprocating the plunger 106 will be described with reference to FIGS. 6 and 7. The reciprocating structure of the present embodiment can improve a magnetic attractive force without increasing a size of the structure and can also restrain generation of an excessive fluid pressure applied to the plunger 106.

The plunger 106 includes a communication passage 161, which axially extends through the plunger 106 along a central axis of the plunger 106. Furthermore, an opening (end groove or connecting passage) 139b extends diametrically through the axial end of the spool 103, which abuts against the plunger 106, as shown in FIG. 7. The opening 139b of the spool 103 is communicated with the communication passage 161 and forms part of a relief passage in corporation with the communication passage 161. In order to allow reciprocal movement of the plunger 106, working fluid spaces or reciprocation spaces G6a, G6b are provided on the axial sides (first and second axial sides) of the plunger 106, respectively. The communication passage 161 of the plunger 106 and the opening 139b of the spool 103 communicate between the space (first reciprocation space of the plunger or first side space) G6a and the space (second reciprocation space of the plunger or second side space) G6b, which are located adjacent to first and second axial ends of the plunger 106, respectively.

When the plunger 106 axially moves in one or the other direction, a positive pressure is developed in one of the spaces G6a, G6b, and a negative pressure is developed in the other one of the spaces G6a, G6b. The communication passage 161 of the plunger 106 and the opening 139b of the spool 103 conducts the positive pressure in the one of the spaces G6a, G6b to the other one of the spaces G6a, G6b, and vice versa. Thus, a pressure difference between the space G6a and the space G6b is largely reduced during the axial movement of the plunger 106. As a result, resistance against the axial movement of the plunger 106 generated by the pressure difference between the space G6a and the space G6b can be largely reduced.

Furthermore, the magnetic flux generated by the coil 104 flows mainly along an outer peripheral portion of the cylindrical plunger 106, so that the communication passage 161 formed along the central axis of the plunger 106 does not substantially interfere with the flow of the magnetic flux.

Working fluid spaces or reciprocation spaces (first and second reciprocation spaces of the large diameter cylindrical portion 103b or second side spaces) G3a, G3b are placed adjacent to axial ends (first and second axial ends) of the large diameter cylindrical portion 103a of the spool 103, respectively. The reciprocation spaces G3a, G3b are defined between the large diameter cylindrical portion 103a of the spool 103 and the sleeve 102. The stator core 152 has an axial through hole, which penetrates through the stator core 152. The small diameter cylindrical portion 103b is received in the axial through hole of the stator core 152. An outer peripheral connecting passage 139a is defined between an outer peripheral surface of the small diameter cylindrical portion 103b and an inner peripheral surface of the stator core 152. The outer peripheral connecting passage 139a is communicated with the reciprocation space G6b of the plunger 106 and also with the reciprocation space G3a of the large diameter cylindrical portion 103a. Furthermore, a second drain passage (connecting passage) 138b penetrates through the peripheral wall of the large diameter cylindrical portion 103a in a radial direction of the large diameter cylindrical portion 103a. With the above arrangement, the communication passage 161 of the plunger 106 is communicated with the reciprocation space G3a of the large diameter cylindrical portion 103a through the opening 139b of the small diameter cylindrical portion 103b, the reciprocation space G6b of the plunger 106, the outer peripheral connecting passage 139a of the small diameter cylindrical portion 103b, and the opening 102a of the sleeve 102 (the opening 102a of the sleeve 102 also acts as part of the reciprocation space G3a). Furthermore, the reciprocation space G3a of the large diameter cylindrical portion 103a is communicated with the reciprocation space G3b of the large diameter cylindrical portion 103a through the second drain passage 138b and the first drain passage 138a of the large diameter cylindrical portion 103a.

In this way, it is possible to increase the working fluid spaces for receiving the working fluid drained from the working fluid spaces G6a, G6b upon expansion and reduction of the working fluid spaces G6a, G6b by the reciprocal movement of the plunger 106. Thus, it is possible to reduce an inner diameter of the communication passage 161 required to restrain generation of the excessive pressure difference between the space G6a and the space G6b, i.e., generation of the excessive fluid pressure.

As a result, although the communication passage 161 reduces the cross-sectional surface area of the plunger 106, the small diameter of the communication passage 161 allows minimization of the reduction of the cross-sectional surface area of the plunger 106, allowing improvement of the magnetic conductivity of the plunger 106 in comparison to a communication passage that has a much larger inner diameter.

Furthermore, as described above, the plunger guide 107 is made of the thin non-magnetic material and includes the flange portion 107b and the cylindrical portion 107a. The flange portion 107b acts as a connecting portion. The cylindrical portion 107a has the closed base end and supports the plunger 106 in an axially movable manner.

With this arrangement, the cylindrical portion 107a of the plunger guide 107 can be arranged between the stator 105 and the plunger 106, i.e., can be arranged along the inner peripheral surface of the stator 105 without causing a deviation of the central axis of the cylindrical portion 107a of the plunger guide 107 from the central axis of the stator 105. Thus, it is possible to restrain deviation between the central axis of the stator 105 and the central axis of the plunger 106. Furthermore, the plunger guide 107 is made of the thin non-magnetic material. Thus, it is possible to minimize an inner diameter of the stator 105, which generally corresponds to an outer diameter of the plunger 106. As a result, it is possible to reduce a radial size of the electromagnetic drive portion S and thus a radial size of the control valve 1 without reduction of the magnetic attractive force.

Excessive working fluid contained in the reciprocation space G3a is returned to the oil drain passage 302 through the second drain passage 138b, the first drain passage 138a and the drain port 124. Thus, a fluid pressure in each of the working fluid spaces G6a, G6b can be generally maintained at the same constant low pressure as that of the oil drain passage 302 communicated with the drain port 124 of the sleeve 102.

The maximum axial displacement L of the spool 103 is limited by the abutment of the large diameter cylindrical portion 103a of the spool 103 against the stopper 159 of the stator 105. Thus, when the electric power is not supplied to the electromagnetic drive portion S, the urging force of the spring 108 is not substantially applied to the closed base end of the cylindrical portion 107a of the plunger guide 107, which receives the plunger 106 in the axially movable manner.

Thus, a wall thickness of the plunger guide 107 can be reduced as long as the wall of the plunger guide 107 is not damaged by the low pressure present in the oil drain passage 302. As a result, it is possible to reduce the radial size of the electromagnetic drive portion S and thus the radial size of the control valve 1 without reducing the magnetic attractive force.

Operation of the control valve 1 will be described with reference to FIGS. 10 and 11.

First, a maximum retarded angular position mode of the control valve 1 shown in FIG. 10 will be described.

Figure 10:
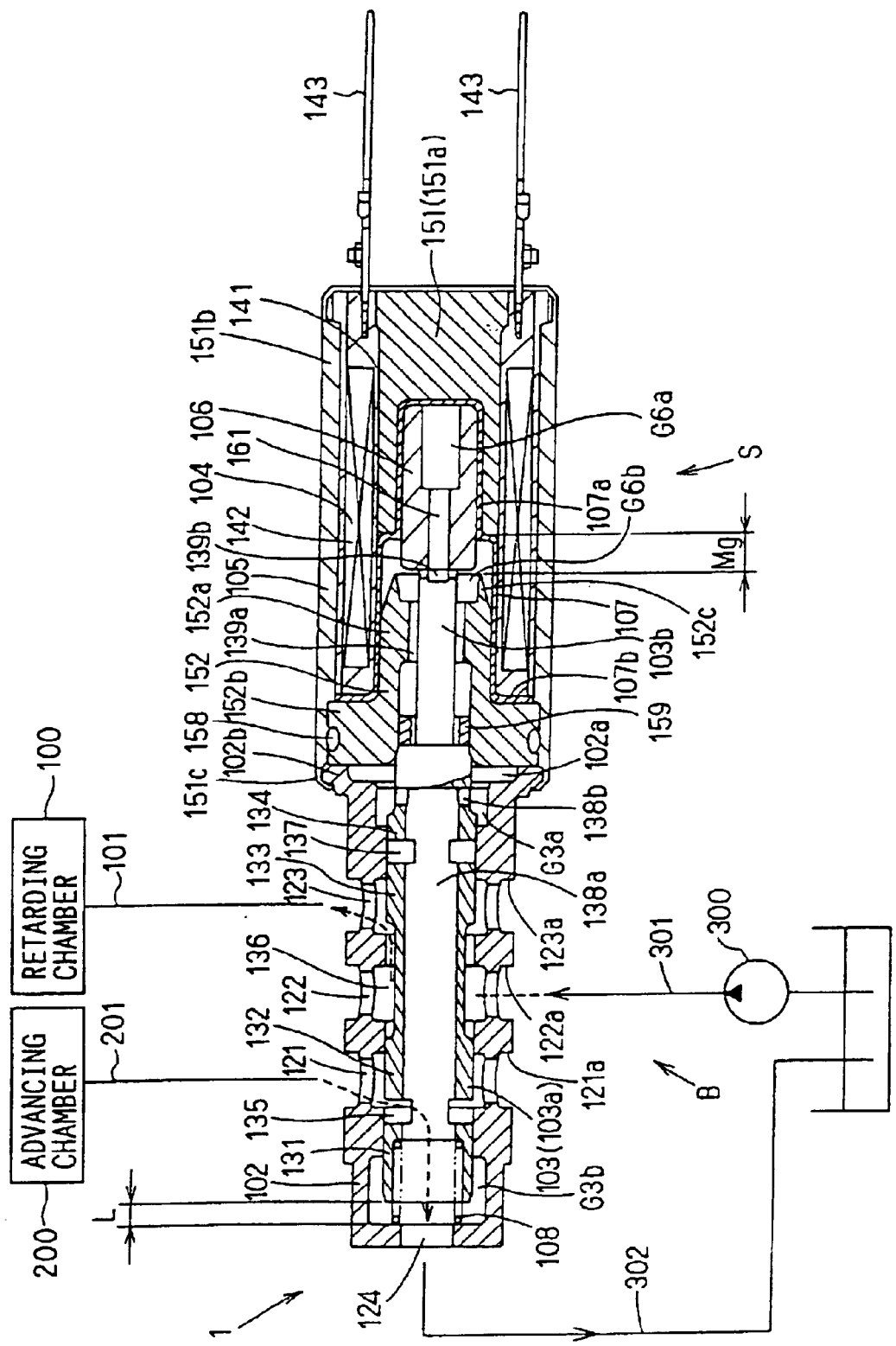
FIG. 10 is a cross-sectional view similar to FIG. 6, showing the solenoid valve in a maximum retarded angular position mode.

In FIG. 10, the electric power is not supplied to the coil 142 of the control valve 1, and thus no electromagnetic attractive force is applied to the plunger 106. As a result, the spool 103 and the plunger 106 are urged to the position shown in FIG. 10 by the urging force of the spring 108. At this time, the input port 122 and the retarding port 123 of the sleeve 102 of the valve portion B are communicated to each other through the second oil passage 136 of the spool 103, and the input port 122 and the advancing port 121 are discommunicated from each other. Thus, the pressurized oil supply passage 301 and the first oil passage 101 are communicated to each other through the input port 122 and the retarding port 123. That is, the oil is supplied from the oil pump 300 to the retarding oil pressure chamber 100. At the same time, the advancing port 121 is communicated with the drain port 124 through the first oil passage 135, so that the oil in the advancing oil pressure chamber 200 is returned to the oil pan. At this stage, the spool 103 is positioned away from the drain port 124 for the distance L shown in FIG. 10.

Next, the maximum advanced angular position mode of the control valve 1 shown in FIG. 11 will be described.

When the control electric current is supplied to the coil 142 from the ECU, the electromagnetic force is generated based on the control electric current. When the electromagnetic force is generated in the solenoid coil 104, the magnetic flux that corresponds to the electromagnetic force flows in the stator 105 and the plunger 106, which form the magnetic circuit. Thus, the plunger 106 is attracted to the attracting portion 152a of the stator 105 in a second axial direction of the valve 1 (left direction in FIG. 11).

At this time, the input port 122 and the advancing port 121 of the sleeve 102 of the valve portion B are communicated to each other through the second oil passage 136 of the spool 103. Furthermore, the input port 122 and the retarding port 123 are discommunicated from each other. Thus, the pressurized oil supply passage 301 and the second oil passage 201 are communicated to each other through the input port 122 and the advancing port 121. That is, the oil is supplied from the oil pump 300 to the advancing oil pressure chamber 200. At the same time, the retarding port 123 is communicated with the drain port 124 through the third oil passage 137, so that the oil in the retarding oil pressure chamber 100 is returned to the oil pan through the oil drain passage 302.

Figure 11:
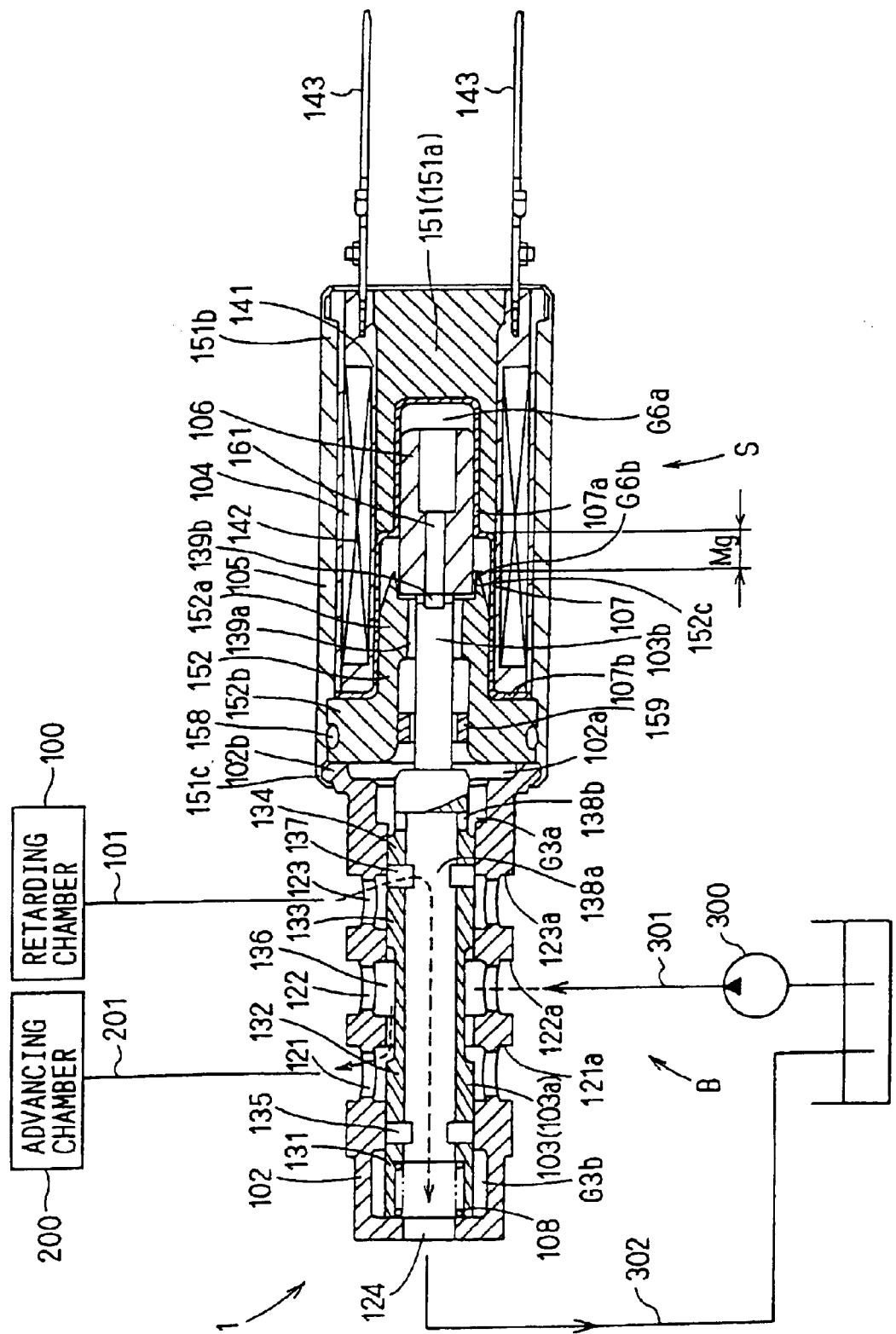
FIG. 11 is a cross-sectional view similar to FIGS. 6 and 10, showing the solenoid valve in a maximum advanced angular position mode.

At this stage, when the control electric current becomes equal to the predetermined value (e.g., the maximum value of the drive current or the intermediate value between the minimum value and the maximum value of the drive current), the control valve 1 is held in the maximum advanced angular position mode shown in FIG. 11.

Modifications of the second embodiment will be described.

Figure 8:
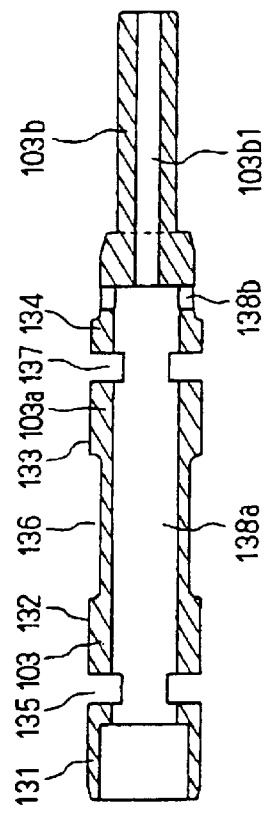
FIG. 8 is a partial cross-sectional view, showing a modification of the spool.

As a first modification of the second embodiment, the spool 103 shown in FIGS. 6, 7, 10 and 11 can be replaced with a spool 103 shown in FIG. 8.

As shown in FIG. 8, the small diameter cylindrical portion 103b of the spool 103 has an axial connecting passage 103b1, which penetrates through the small diameter cylindrical portion 103b in the axial direction. Thus, when the plunger 106 is axially moved, the working fluid drained through the communication passage 161 of the plunger 106 is conducted to the reciprocation space G3a through the axial connecting passage 103b1 and the second drain passage 138b.

With this arrangement, the advantages similar to those discussed with reference to the second embodiment can be achieved.

Figure 9:
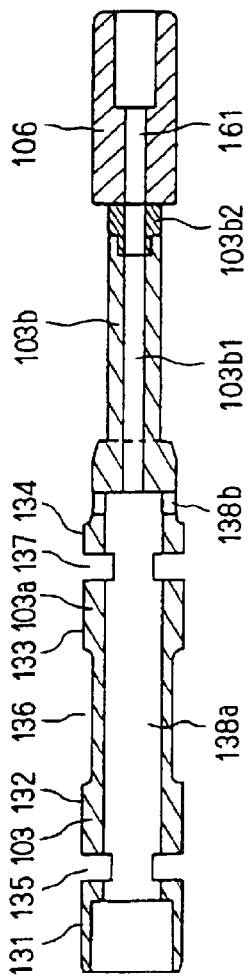
FIG. 9 is a partial cross-sectional view, showing another modification of the spool.

As a second modification of the second embodiment, a spool 103 shown in FIG. 9 is provided in place of the spool 103 shown in FIGS. 6, 7, 10 and 11. The spool 103 shown in FIGS. 6, 7, 10 and 11 is made of the non-magnetic material. However, a main body of the spool 103 shown in FIG. 9 is made of a magnetic material. A tubular portion 103b2 made of a non-magnetic material is secured to the end of the small diameter cylindrical portion 103b of the spool 103 and abuts against the plunger 106.

That is, the non-magnetic tubular portion 103b2 is placed between the plunger 106 and the spool 103, which are made of the magnetic material. Thus, the spool 103 (more specifically, portion of the spool 103 other than the tubular portion 103b2) is magnetically insulated by the tubular portion 103b2 and thus is not directly magnetized by the plunger 106, which is magnetized by the electromagnetic force of the solenoid coil 104.

Furthermore, the stopper 159 of the stator 105, which limits the maximum axial displacement L of the spool 103 is made of a non-magnetic material. Thus, the spool 103 is magnetically insulated by the non-magnetic stopper 159 of the stator 105 and is thus not directly magnetized by the plunger 106.

In the second embodiment, the boss portion 152c of the stator core 152 has the tapered outer peripheral surface and the tapered inner peripheral surface. However, it is possible to eliminate the taper from at least one of the tapered outer peripheral surface and the tapered inner peripheral surface of the boss portion 152c, if desired.

Additional advantages and modifications will readily occur to those skilled in the art. The invention in its broader terms is therefore, not limited to the specific details, representative apparatus, and illustrative examples shown and described.

What is claimed is:

1. A solenoid valve comprising:
   a slider, which is axially reciprocable and includes a communication passage that extends through the slider generally along a central axis of the slider, wherein the communication passage is communicated with at least one first side space located on first axial side of the slider and is also communicated with at least one second side space located on second axial side of the slider;
   a spring, which provides urging force for urging the slider in a first axial direction of the solenoid valve;
   a coil, which generates magnetomotive force for attracting the slider in a second axial direction opposite to the first axial direction;
   a first stator segment, which includes an attracting portion, wherein the attracting portion is axially opposed to the slider and attracts the slider in the second axial direction upon generation of the magnetomotive force by the coil;
   a second stator segment, which forms a magnetic circuit in cooperation with the slider and the first stator segment and includes a tubular portion, wherein the tubular portion is at least partially placed radially outward of the slider;
   a non-magnetic body, which is at least partially placed radially inward of the tubular portion of the second stator segment to slidably support the slider therein; and
   a valve member, said valve member having an extending portion which directly contacts the slider without abutting any intervening structure.

2. A solenoid valve according to claim 1,
   wherein the valve member is arranged in an axially reciprocable manner and is urged against the slider by the urging force of the spring such that the valve member moves together with the slider, wherein the valve member defines at least one connecting passage, which communicates between the communication passage of the slider and the at least one second side space; and
   the solenoid valve further comprises a valve housing, which receives the valve member.

3. A solenoid valve according to claim 2, wherein:
   the at least one first side space includes a first reciprocation space of the slider, which is located adjacent to a first axial end of the slider and allows axial movement of the slider in the first axial direction; and
   the at least one second side space includes a second reciprocation space of the slider, which is located adjacent to a second axial end of the slider and allows axial movement of the slider in the second axial direction.

4. A solenoid valve according to claim 3, wherein:
   the at least one connecting passage defined by the valve member includes an end groove, which is formed in one end of the valve member in opposed relationship to the communication passage of the slider; and
   the end groove of the valve member extends diametrically through the one end of the valve member and communicates between the communication passage of the slider and the second reciprocation space of the slider.

5. A solenoid valve according to claim 3, wherein:
   the valve member includes a large diameter cylindrical portion and a small diameter cylindrical portion, wherein the small diameter cylindrical portion comprises said extending portion that abuts against the slider; and the at least one second side space includes at least one of first and second reciprocation spaces of the large diameter cylindrical portion, which are arranged adjacent to first and second axial ends of the large diameter cylindrical portion, respectively, to allow reciprocation of the valve member.

6. A solenoid valve according to claim 5, wherein:

the first stator segment includes an axial through hole, which axially penetrates through the first stator segment and receives the small diameter cylindrical portion of the valve member, wherein an outer peripheral surface of the small diameter cylindrical portion of the valve member defines an outer peripheral connecting passage in cooperation with an inner peripheral surface of the first stator segment;

the outer peripheral connecting passage of the small diameter cylindrical portion of the valve member is communicated with the second reciprocation space of the slider and also with the first reciprocation space of the large diameter cylindrical portion of the valve member; and the at least one connecting passage defined by the valve member includes the outer peripheral connecting passage of the small diameter cylindrical portion of the valve member.

7. A solenoid valve according to claim 6, wherein:

the large diameter cylindrical portion of the valve member includes:
  a first drain passage, which extends in an axial direction of the large diameter cylindrical portion and penetrates through the second axial end of the large diameter cylindrical portion such that the first drain passage is communicated with the second reciprocation space of the large diameter cylindrical portion; and
  a second drain passage, which penetrates through a wall of the large diameter cylindrical portion and is communicated with the first drain passage of the large diameter cylindrical portion and also with the first reciprocation space of the large diameter cylindrical portion; and the at least one connecting passage defined by the valve member includes the first drain passage and the second drain passage of the large diameter cylindrical portion.

8. A solenoid valve according to claim 7, wherein:

the valve housing includes a drain part for draining a working fluid from the solenoid valve; and the drain port of the valve housing is communicated with at least one of the first and second reciprocation spaces of the large diameter cylindrical portion of the valve member.

9. A solenoid valve according to claim 2, wherein:

the valve member includes a large diameter cylindrical portion and a small diameter cylindrical portion, wherein the small diameter cylindrical portion comprises said extending portion that abuts against the slider;

the at least one second side space includes at least one of first and second reciprocation spaces of the large diameter cylindrical portion, which are arranged adjacent to first and second axial ends of the large diameter cylindrical portion, respectively, to allow reciprocation of the valve member;

the small diameter cylindrical portion includes an axial connecting passage, which extends through the small diameter cylindrical portion in an axial direction of the small diameter cylindrical portion and is communicated with the communication passage of the slider;

the large diameter cylindrical portion includes:
  a first drain passage, which extends in an axial direction of the large diameter cylindrical portion and is communicated with the axial connecting passage of the small diameter cylindrical portion, wherein the first drain passage penetrates through the second axial end of the large diameter cylindrical portion such that the first drain passage is communicated with the second reciprocation space of the large diameter cylindrical portion; and
  a second drain passage, which penetrates through a wall of the large diameter cylindrical portion and is communicated with the first drain passage of the large diameter cylindrical portion and also with the first reciprocation space of the large diameter cylindrical portion; and the at least one connecting passage defined by the valve member includes the axial connecting passage of the small diameter cylindrical portion, the first drain passage of the large diameter cylindrical portion and the second drain passage of the large diameter cylindrical portion.

10. A solenoid valve according to claim 9, wherein:

the valve member is made of a magnetic material;

the slider is made of a magnetic material; and one end of the small diameter cylindrical portion, which abuts against the slider, includes a tubular portion, which is made of a non-magnetic material.

11. A solenoid valve according to claim 9, wherein:

the valve housing includes a drain port for draining a working fluid from the solenoid valve; and the drain port of the valve housing is communicated with at least one of the first and second reciprocation spaces of the large diameter cylindrical portion of the valve member.

12. A solenoid valve comprising:

a slider, which is axially reciprocable and includes a communication passage that extends through the slider generally along a central axis of the slider, wherein the communication passage is communicated with at least one first side space located on first axial side of the slider and is also communicated with at least one second side space located on second axial side of the slider;

a spring, which provides urging force for urging the slider in a first axial direction of the solenoid valve;

a coil, which generates magnetomotive force for attracting the slider in a second axial direction opposite to the first axial direction;

a first stator segment, which includes an attracting portion, wherein the attracting portion is axially opposed to the slider and attracts the slider in the second axial direction upon generation of the magnetomotive force by the coil;

a second stator segment, which forms a magnetic circuit in cooperation with the slider and the first stator segment and includes a tubular portion, wherein the tubular portion is at least partially placed radially outward of the slider; and a non-magnetic body, which is at least partially placed radially inward of the tubular portion of the second stator segment to slidably support the slider therein, wherein the first stator segment includes a boss portion, which axially protrudes from an outer peripheral side of the attracting portion toward the slider, wherein the boss portion includes a tapered outer peripheral surface and a tapered inner peripheral surface.

* * * * *